US007322112B2

(12) United States Patent
Boerner

(10) Patent No.: US 7,322,112 B2
(45) Date of Patent: Jan. 29, 2008

(54) KITCHEN SLICER

(75) Inventor: Juergen Boerner, Landscheid-Niederkail (DE)

(73) Assignee: Boerner Kunststoff-und Metallwarenfabrik GmbH, Landscheid-Niederkail (DE)

( * ) Notice: Subject to any disclaimer, the term of this patent is extended or adjusted under 35 U.S.C. 154(b) by 0 days.

(21) Appl. No.: 11/303,404

(22) Filed: Dec. 16, 2005

(65) Prior Publication Data

US 2006/0123639 A1 Jun. 15, 2006

Related U.S. Application Data

(63) Continuation of application No. PCT/EP04/06395, filed on Jun. 14, 2004.

(30) Foreign Application Priority Data

Jun. 18, 2003 (DE) ................................ 103 28 506

(51) Int. Cl.
*A47J 43/25* (2006.01)
*B26D 3/26* (2006.01)

(52) U.S. Cl. ......................... 30/279.2; 30/278; 83/856; 99/537

(58) Field of Classification Search ............... 30/279.2, 30/278; 83/699.51, 856; 99/537; 241/100
See application file for complete search history.

(56) References Cited

U.S. PATENT DOCUMENTS

| | | | | | |
|---|---|---|---|---|---|
| 66,402 | A * | 7/1867 | Schwartz | 83/856 |
| 2,766,693 | A * | 10/1956 | Duszynski | 83/699.51 |
| 4,212,431 | A * | 7/1980 | Doyel | 241/100 |
| 4,290,196 | A * | 9/1981 | Borner | 30/122 |
| 4,733,588 | A * | 3/1988 | Yamamoto | 83/857 |
| 5,148,731 | A | 9/1992 | Boerner | |
| 5,745,999 | A | 5/1998 | Zirkiev | |
| 5,765,472 | A * | 6/1998 | Kim | 99/537 |
| 6,805,044 | B1 * | 10/2004 | Yamamoto | 99/537 |
| 2002/0174754 | A1 * | 11/2002 | Vincent | 83/247 |
| 2004/0031158 | A1 | 2/2004 | Boerner | |

FOREIGN PATENT DOCUMENTS

| | | |
|---|---|---|
| DE | 35 00 959 | 7/1986 |
| DE | 10054174 | 11/2000 |
| EP | 0 306 017 | 3/1989 |
| EP | 1 264 669 | 12/2002 |

OTHER PUBLICATIONS

International Preliminary Report on Patentability for PCT/EP2004/006395, filed Jun. 14, 2004.

* cited by examiner

*Primary Examiner*—Hwei-Siu Payer
(74) *Attorney, Agent, or Firm*—Klarquist Sparkman, LLP

(57) ABSTRACT

A kitchen slicer for cutting items to be cut such as fruit, vegetables etc. is proposed, with a base, to which a blade is fixed, which is arranged on an edge of a discharge plate, and an exchangeable insert, which can be fixed to the base in different positions for setting different cutting thicknesses. The insert forms a guide surface on which the items to be cut can be moved toward the blade. The different positions including a safety position in which an end side of the insert is arranged adjacent to the blade, in particular in such a way that the guide surface lies at the level of the blade or above it. In this connection, the insert comprises on its rear end side at least one projection which lies below the blade in the safety position.

15 Claims, 6 Drawing Sheets

KITCHEN SLICER

CROSS-REFERENCES TO RELATED APPLICATIONS

This application is a continuation of copending International Patent Application No. PCT/EP2004/006395, filed on Jun. 14, 2004, which claims priority under the Paris Convention from German Patent Application No. 103 28 506.7, filed on Jun. 18, 2003. These prior applications are incorporated by reference herein.

BACKGROUND

The present invention relates to a kitchen slicer for cutting items to be cut such as fruit, vegetables etc., with a base, to which a blade is fixed, which is arranged on an edge of a discharge plate, and an exchangeable insert, which can be fixed to the base in different positions for setting different cutting thicknesses, the insert forming a guide surface on which the items to be cut can be moved toward the blade, the different positions including a safety position in which an end side of the insert is arranged adjacent to the blade, in particular in such a way that the guide surface lies at the level of the blade or above it.

A kitchen slicer of this type is known from DE 100 54 174 A1.

Kitchen slicers of this kind are used for cutting items to be cut such as fruit, vegetables etc. In this connection, the kitchen slicer is as a rule held with one hand or placed on a bowl. With the other hand, the item to be cut is moved backward and forward in the longitudinal direction over the guide surface and the discharge surface either directly or by means of a separate holder. With every pass from the guide surface toward the discharge surface, a slice is cut off by the blade from the item being cut and falls downward through a slot between the blade and the guide surface.

In this connection, the blade is generally aligned transversely to the longitudinal extent of the base. The blade can then be aligned at right angles or diagonally to the longitudinal axis of the base. However, it is especially preferred if the blade tapers in a V shape in the cutting direction. Slicers of the latter kind have been known from the house of the applicant for a long time under the designation "V slicer."

For adjustment of the cutting thickness, the exchangeable insert can be removed from the base and, rotated by 180°, inserted again. Furthermore, inserts of different kinds can also be used, for example those with a number of upright blades which cut vertically into the item being cut during a cutting pass. If the item being cut is rotated by 90° for the subsequent cutting pass, cubes can consequently be produced instead of slices.

It is known from DE 100 54 174 A1 mentioned in the introduction to mount the insert displaceably as a whole on the base. In this connection, it is possible to adjust the cutting height by displacing the insert longitudinally in relation to the base. By using ramps or the like, it can be ensured that the guide surface is in all positions arranged roughly parallel to the discharge surface and thus to the blade. By virtue of this, the cutting quality can be consistently good at all cutting thicknesses, in contrast to those kitchen slicers in which the insert is mounted pivotably about a transverse axis. In these kitchen slicers, a different angle is consequently set between the guide surface and the blade depending on the position of the insert, which leads during the cutting operation to squashing of the item being cut and thus to reduced cutting quality.

It is furthermore known from the abovementioned DE 100 54 174 A1 to position the insert in a safety position in such a way that an end side of the insert is arranged adjacent to the blade, in particular in such a way that the guide surface lies at the level of the blade or above it.

By virtue of this, the as a rule very sharp blade is covered by the end side of the insert. Accordingly, it is generally possible in the safety position to avoid a user unintentionally touching the blade edge. This applies especially to children, who are often unaware of the sharpness of the blade. Accidents can accordingly be avoided.

In the safety position, the insert lies on a support plate of the base, so that it is essentially possible to avoid the insert being bent downward in relation to the blade in the direction toward the support plate. Injuries can accordingly be avoided even when pressure is inadvertently exerted on the insert from above in the region of the blade.

It has been found, however, that even this known kitchen slicer is still capable of being improved with regard to safety.

SUMMARY

It would be advantageous to provide a kitchen slicer of the kind referred to in the introduction in which safety as far as injuries are concerned can be improved still further.

The kitchen slicer referred to in the introduction can have an insert comprising on its rear end side at least one projection which lies below the blade in the safety position.

By means of the projection, it is possible to prevent the insert being pushed up from below in relation to the blade. Accordingly, the blade is protected safely in the event of any loading of the insert (whether this be a force on the insert from above or from below).

In this way, the object is achieved completely.

In this connection, it is especially advantageous if the insert lies at least partly on a support of the base in the region of the rear end side in the safety position.

This measure makes it possible to avoid the insert being pushed away downward in relation to the blade in the region of the end side. Accordingly, the danger of injuries is further reduced.

According to a further preferred embodiment, the blade is V-shaped, and the end side of the insert tapers in a correspondingly V-shaped manner toward a point, the projection being arranged in the region of the point of the end side.

This makes it possible to avoid the insert being pushed through upward in relation to the blade in the region of its point. This is an especially important region as the insert is often accessible from below precisely in the region of the point.

In this connection, it is especially advantageous if the projection is arranged around the point.

This makes it possible to increase safety still further as twisting of the insert about the longitudinal axis can also be excluded.

Overall, it is furthermore advantageous if the base and the insert comprise fixing portions assigned to one another in order to fix the insert to the base operationally safely in the different positions.

The fixing portions may comprise a clamping arrangement.

However, it is especially preferred if the fixing portions are designed as a catch.

This makes it possible to achieve greater operational safety as catch connections as a rule do not come loose even in the event of relatively great stress, such as can occur, for example, when there is great pressure from above on the insert during a cutting or return pass.

However, it is especially preferred if the insert is fixed to the base in the safety position by the fixing portions and an additional catch unit.

This makes it possible for one thing to ensure that the fixing portions can be released relatively easily, in spite of great operational safety, in order to transfer the insert from one operating position to another.

The additional catch unit makes it possible to ensure that release of the insert from the safety position into one of the operating positions has to be performed with a relatively great effort. Advantageously, this results in the insert remaining safely in the safety position even in the event of inadvertently great force in the release direction. Protection against injuries is accordingly increased still further.

In this connection, it is especially advantageous if the additional catch unit is provided on the lower side of the insert.

By virtue of this, the additional catch unit is as it were “hidden”, so that it is made impossible in particular for children, who do not know the location of the additional catch unit, to release it.

Furthermore, it is advantageous if the additional catch unit comprises a catch lever which projects from the lower side of the insert and engages behind an edge of the base in the safety position.

This allows the catch unit to be produced especially easily constructionally and without additional components.

In this connection, it is especially advantageous if the edge is provided on an end side of a support plate on which the insert inserted into the base lies.

By virtue of this, the support plate as a rule present anyway can be used as part of the additional catch unit.

It is clear that the features mentioned above and those still to be explained below can be used not only in the combination indicated in each case but also in other combinations or individually without leaving the scope of the present invention.

BRIEF DESCRIPTION OF THE DRAWINGS

Illustrative embodiments of the invention are shown in the drawing and explained in greater detail in the description below. In the drawings.

DETAILED DESCRIPTION OF PREFERRED EMBODIMENTS

Figure 1:
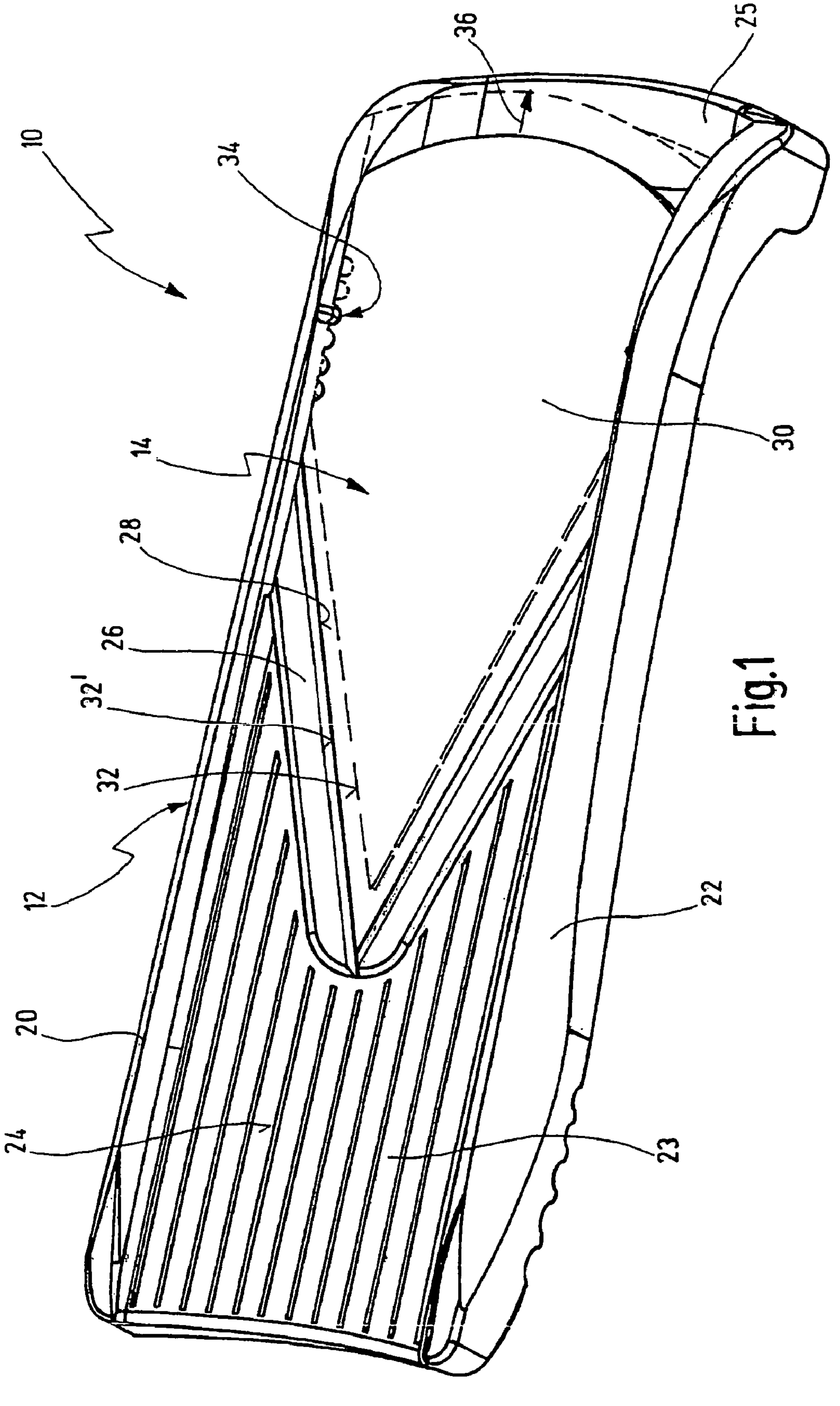
FIG. 1 shows a perspective illustration of a preferred embodiment of the kitchen slicer according to the invention with a base and inserted insert in the safety position.

An embodiment of the kitchen slicer according to the invention is designated generally by 10 in FIG. 1.

The kitchen slicer 10 comprises a base 12 and an exchangeable insert 14.

The base 12 and the insert 14 can be made from plastic. Alternatively, it is also possible to make the base 12 and the insert 14 from stainless steel.

The base 12 comprises two parallel longitudinal supports 20, 22. A discharge plate 23, the upper side of which forms a discharge surface 24, is provided between the longitudinal supports 20, 22.

At the other end of the base 12, the two longitudinal supports 20, 22 are interconnected via a handle 25.

A V-shaped blade 26 is provided on a front end side of the discharge plate 23. The V blade 26 can have the plastic of the base 12 molded around it or, if the latter is made of metal, can be connected non-detachably to it, for example by spot welding or bonding.

A front V-shaped cutting edge of the V blade 26 is designated by 28.

The insert 14 is inserted into the base 12 in a region between the handle 25 and the V blade 26. An upper side of the insert 14 forms a guide surface 30.

A rear end side 32 of the insert 14 is designed, corresponding to the shape of the V blade 26, with a V-shaped taper.

In the embodiment shown, the end side 32 lies in direct proximity to the cutting edge 28 of the V blade 26.

The insert 14 can as a whole be displaced in the axial direction on the base 12, the insert being fixable to the base 12 in different positions. In the embodiment shown, the insert 14 can be fixed to the base 12 in four different positions by corresponding fixing portions, such as a catch, e.g., a catch comprising a catch member 34.

The adjustment direction of the insert 14 in relation to the base 12 is illustrated diagrammatically in FIG. 1 at 36. A further operating position of the insert 14 in the base 12, in which the end side 32' is arranged with a spacing in the axial direction from the cutting edge 28, is also illustrated in dashed lines.

As will be further explained below, the insert 14 is displaced downward in a parallel manner in relation to the plane of the blade 26 when movement takes place in the direction 36. Accordingly, by setting the different operating positions, a different cutting thickness can be set in each case, which is determined by the vertical spacing between the guide surface 30 and the cutting edge 28 of the blade 26.

The position of the insert 14 shown by solid lines in FIG. 1 is a safety position in which the cutting edge 28 of the V blade 26 is covered by the end side 32 of the insert 14, as will be further explained below.

Figure 2:
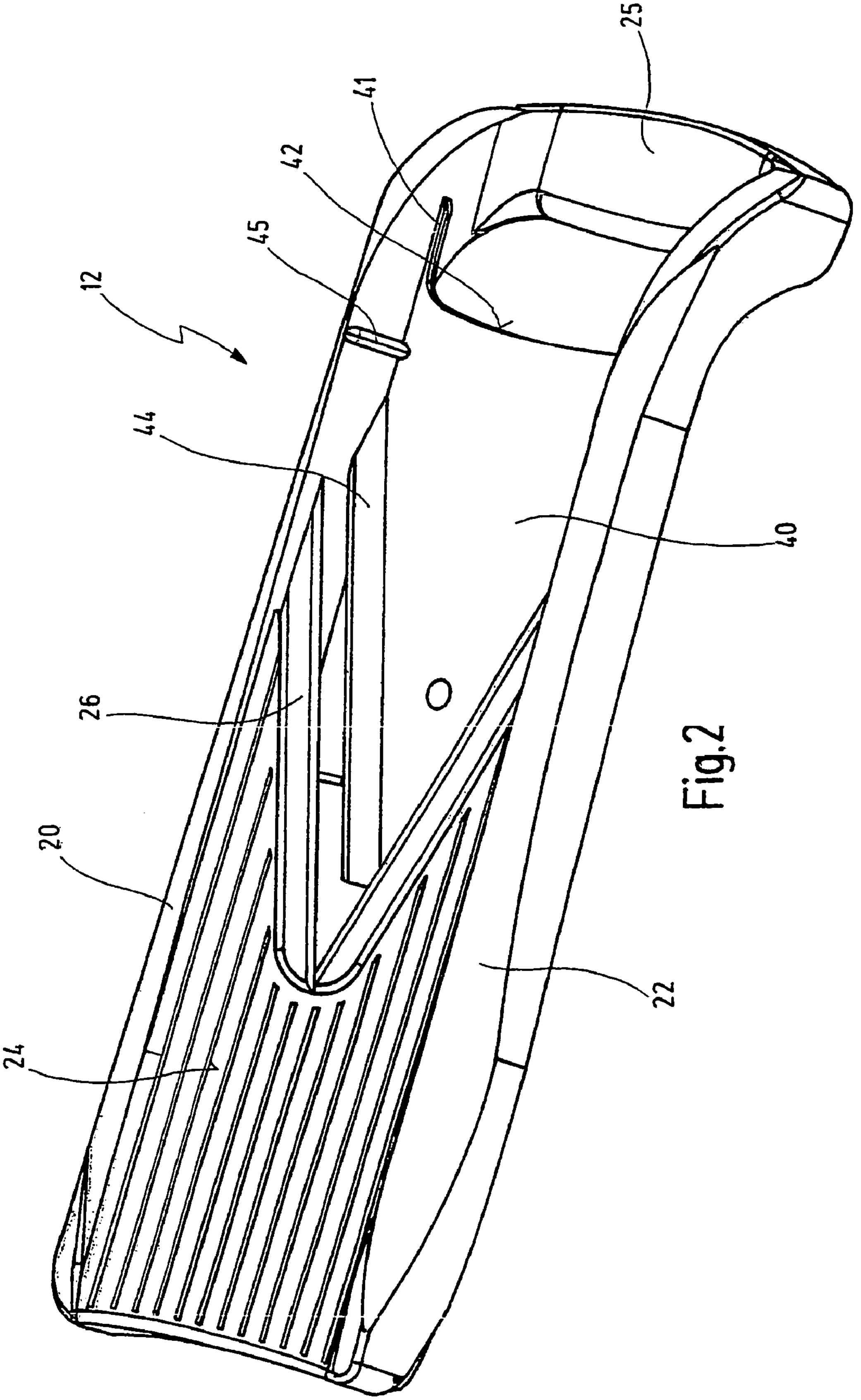
FIG. 2 shows a perspective view of the base of the kitchen slicer in FIG. 1.

In FIG. 2, the base 12 is illustrated without the insert 14 inserted therein.

It can be seen that the two longitudinal supports 20, 22 are interconnected by a support plate 40 in the region into which the insert 14 is to be inserted.

The support plate 40 continues at the edge of the two longitudinal supports 20, 22 in each case in the form of two support rails 41 (only one of which is illustrated in FIG. 2).

The support plate 40 ends toward the front in a front edge 42. The front edge 42 is arranged at a spacing from the handle 25, so that the handle 25 can be gripped all around its periphery by a hand.

The support plate 40 is likewise designed with a V-shaped taper on its rear end side, so that the shape of the support plate 40 corresponds generally to the shape of the insert 14.

In the region of the rear end side, the support plate 40 is provided with a V ramp 44. The V ramp 44 consists of two ramp portions which converge on one another in a V-shape and each form a ramp, starting from the support plate 40, at an angle upward in the direction toward the V blade 26.

An upright or vertical catch projection 45, which forms part of the catch device 34, is designed in each case on the inner sides, which face one another, of the two longitudinal supports 20, 22.

Figure 3:
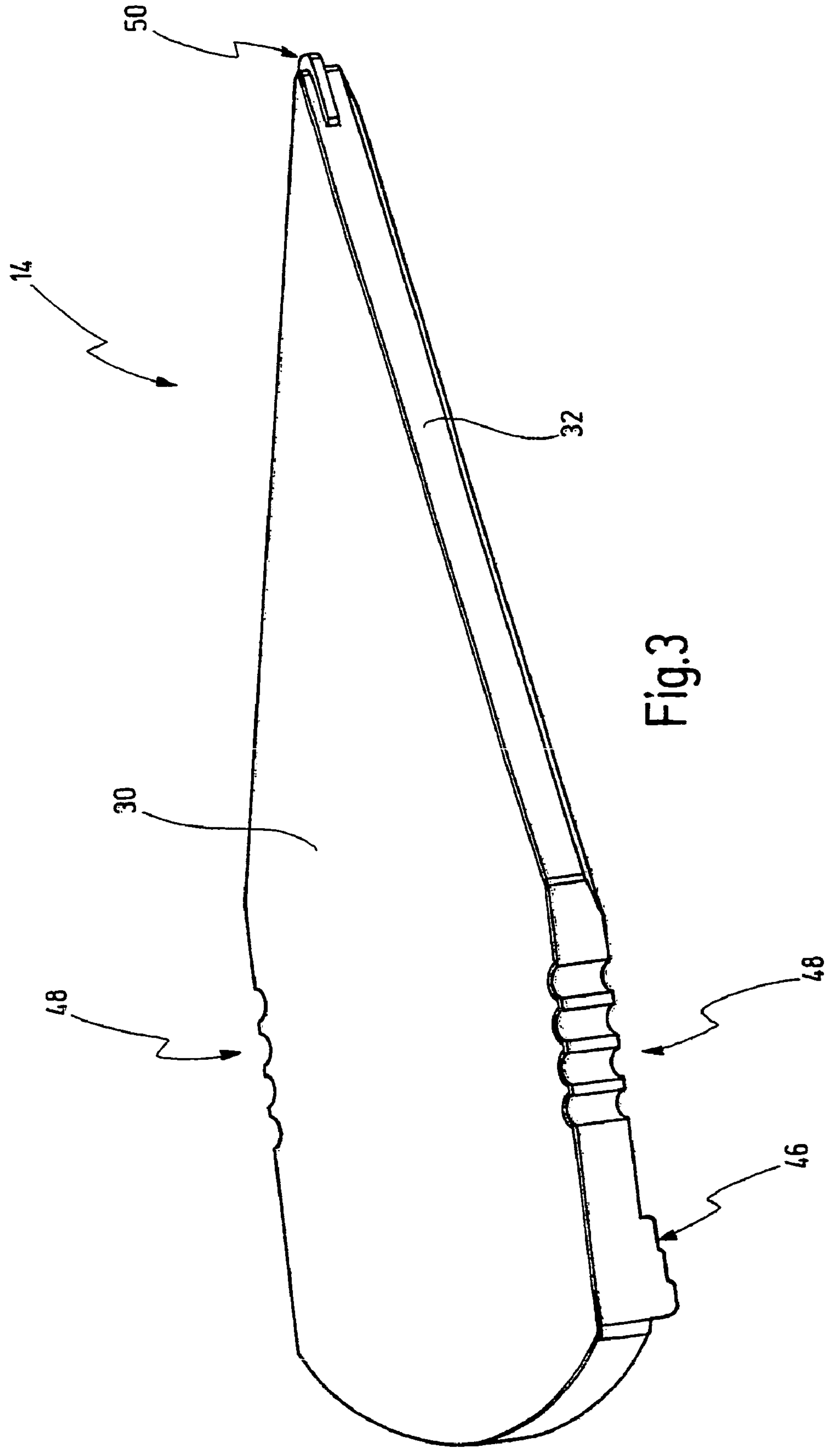
FIG. 3 shows a perspective view of the insert of the kitchen slicer in FIG. 1 at an angle from above.
Figure 4:
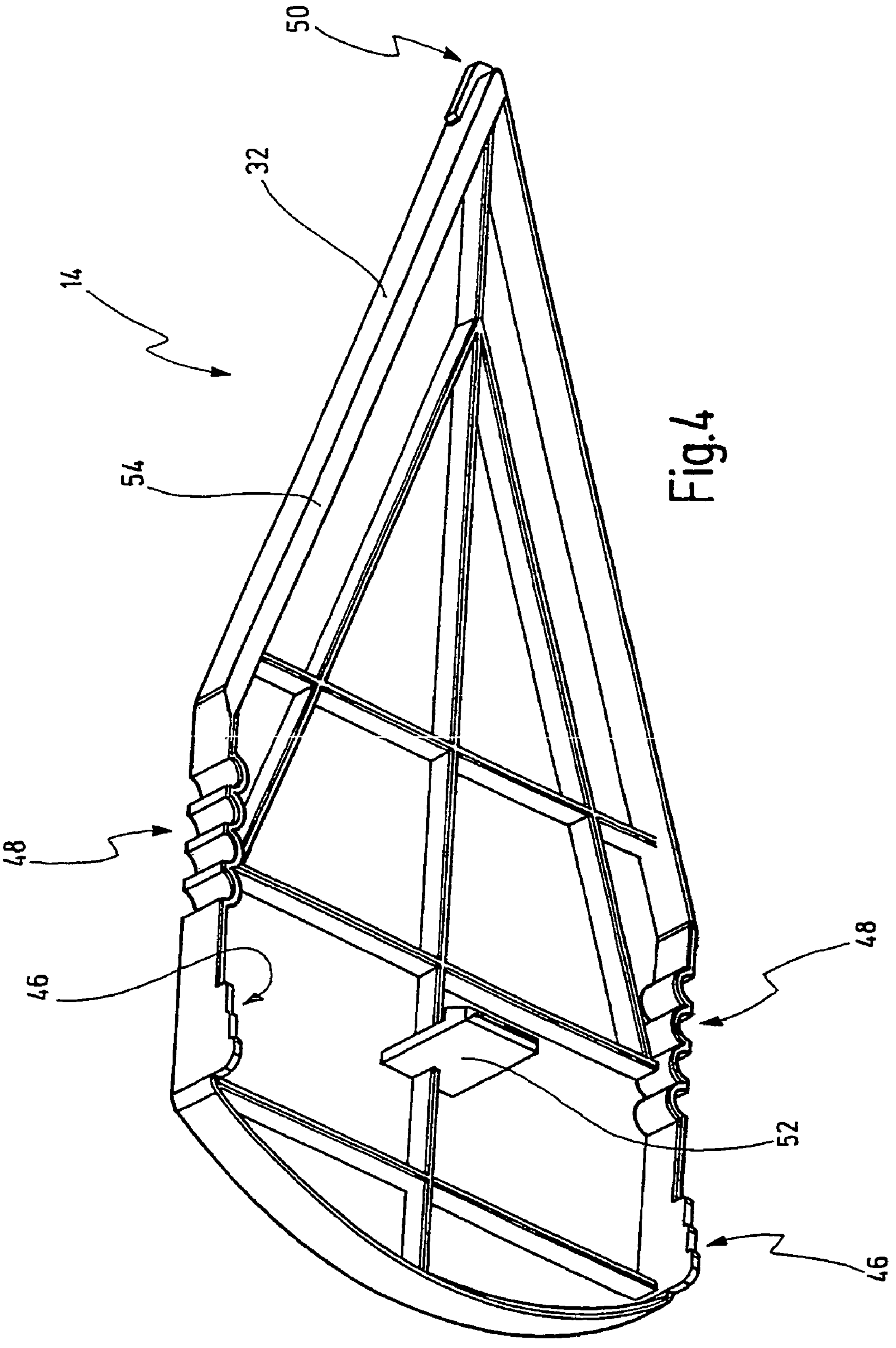
FIG. 4 shows a perspective view of the insert of the kitchen slicer in FIG. 1 at an angle from below.

In FIGS. 3 and 4, the insert 14 of the kitchen slicer in FIG. 1 is shown separated from the base 12.

It can be seen that the insert 14 comprises on its side edges a large number of catch indentations 48 (in the present case four). The catch indentations 48 are one example of corresponding fixing portions and are part of the catch.

Adjacent to the front (in FIGS. 3 and 4 the left) end side 32 of the insert 14, a step arrangement 46 is in each case designed on the lower side.

In the region of the step arrangement 46, the lower side of the insert 14 forms in the region of the side edges a large number of steps (in the present case four), which are in each case designed to rest on the support rails 41.

Depending on the axial position of the insert 14 within the base 12, one or more steps of the step arrangement 46 project downward in relation to the front end of the support rails 41. Accordingly, the front (in FIG. 3 the left) region of the insert 14 is arranged higher or lower in relation to the base 12 depending on the position of the step arrangement 46 relative to the support rails 41.

On the front region of the end side 32, more precisely in the region of its point, a projection 50 which runs around the point and projects toward the rear (in FIG. 3 to the right) is designed. This projection will be explained in detail below.

Furthermore, a downwardly projecting catch lever 52, which is designed for the purpose of entering into engagement with the front edge 42 of the support plate 40 in the safety position, is provided roughly centrally on the lower side of the insert 14 (cf. FIG. 4).

A V counter-ramp 54, which has essentially the same ramp angle as the V ramp 44 of the support plate 40, is provided in each case on the lower side of the insert 14 in the region of the end side 32.

In a first operating position, the lower side of the insert 14 lies directly on the support plate 40, the V ramp 44 and the V counter-ramps 54 lying directly opposite one another. By axial displacement of the insert 14 in relation to the base 12 (in particular counter to the direction 36, which is shown in FIG. 1), the V ramp 44 and the V counter-ramps 54 enter into engagement with one another, so that the insert 14 is raised in the region of its rear end side 32. Accordingly, a first step of the step arrangement 46 then lies on the support rails 41 in the next catching position of the catch member 34.

The third catching position of the catch member 34 is reached by further axial displacement in the rearward direction, so that the second step of the step arrangement 46 lies on the support rails 41. This reduces the cutting height still further.

In the final position of the catch member 34, a safety position is set. In this connection, the last step of the step arrangement 46 lies on the support rails 41, the catch lever 52 engages behind the front edge 42 of the support plate 40, and the end side 32 lies directly opposite the V blade 26.

Figure 5:
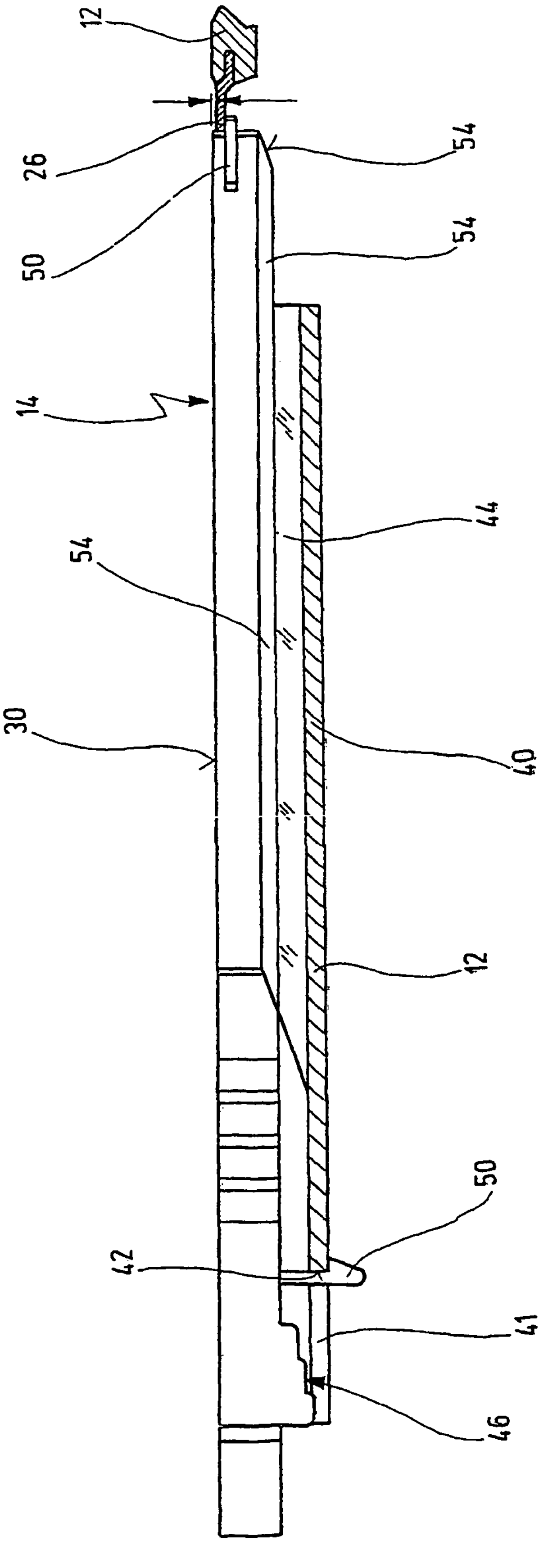
FIG. 5 shows a diagrammatic longitudinal sectional view through the kitchen slicer in FIG. 1.

This position is illustrated as a diagrammatic sectional view in FIG. 5.

Here, it can be seen that the catch lever 52 engages behind the front edge 42 of the support plate 40. The last step of the step arrangement 46 lies on the support rails 41. The V counter-ramps 54 have "climbed up" the V ramp 44 over its entire length.

Accordingly, the insert 14 lies on the V ramp 44 and the support rails 41 with its lower side generally at a spacing from the support plate 40.

In this connection, the projection 50 on the rear point of the insert 14 lies directly below the blade 26, as is illustrated in FIG. 5.

In this position, furthermore, the guide surface 30 of the insert 14 lies above the upper side of the V blade 26.

This situation is also illustrated correspondingly in a view from below in FIG. 6.

Figure 6:
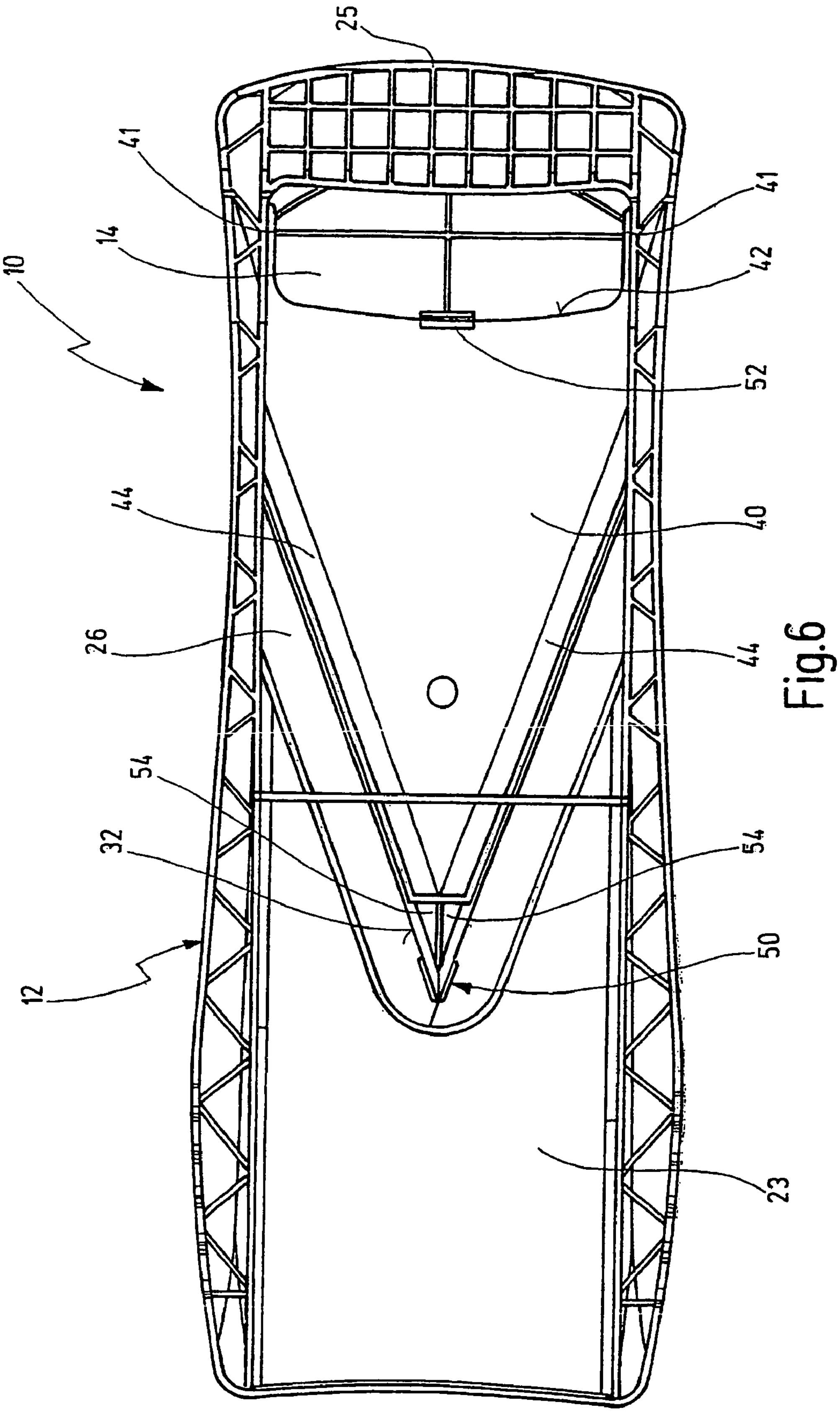
FIG. 6 shows the kitchen slicer illustrated in FIG. 1 in a view from below.

The overall result in this safety position, which is illustrated in FIGS. 1, 5 and 6, is that the V blade 26 is covered over its entire length by the end side 32 of the insert 14.

Unintentional exposure of the V blade 26 by pressure on the insert 14 from above is avoided by virtue of the fact that the insert 14 lies on the support plate 40, or on the V ramp 44, virtually as far as the point of the rear end side 32.

Even when very great pressure is applied to the insert 14 in the region of its rear point, access to the blade 26 is excluded as the upper side 30 of the insert 14 lies generally above the blade 26. The flexibility of the insert 14 is selected in such a way that it is not possible to deflect the insert 14 further downward at its rear point than to a position in which the upper side 30 lies at the level of the blade 26.

Furthermore, in the safety position, the kitchen slicer 10 is also secured against misuse by pressure on the insert 14 from below. This is because pressure on the insert 14 from below (in the region of its point, where the insert 14 is exposed from below in relation to the support plate 40) leads to the projection 50 pressing against the blade 26 from below.

A user is accordingly prevented from touching the blade 26 inadvertently from the lower side of the inserted insert 14.

Generally, in any of the four different positions, the insert 14 is secured in the axial direction by the catch member 34.

In the safety position, the insert 14 is secured additionally on the base 12, in particular by means of the catch lever 52 which engages behind the front edge 42 of the support plate 40.

In this connection, it is on the one hand not possible to lift the insert 14 upward in relation to the support plate 40. On the other hand, the catching of the catch lever 52 on the front edge 42 is selected in such a way that a certain stress is brought about between the support plate 40 and the insert 14. This increases the static friction between insert 14 and base 12. Accordingly, it is more difficult to displace the insert 14 in relation to the base 12 into one of the operating positions (in direction 36 in FIG. 1) starting from the safety position than it is to displace it between the other individual operating positions, in which the axial holding force is brought about solely by the catch device 34 and the normal static friction between insert 14 and base 12.

Overall, the kitchen slicer 10 illustrated affords particularly great protection as far as misuse (by children for example) is concerned and/or great safety with regard to injuries which could be caused by careless handling of the kitchen slicer if it were not designed according to the invention.

What is claimed is:

1. A kitchen slicer for cutting items to be cut such as fruit, vegetables etc., with a base, to which a blade is fixed, which is arranged on an edge of a discharge plate, and an exchangeable insert, which can be fixed to the base in different positions for setting different cutting thicknesses, the insert forming a guide surface on which the items to be cut can be moved toward the blade, the different positions including a safety position in which an end side of the insert is arranged adjacent to the blade in such a way that the guide surface lies at the level of the blade or above it, wherein the insert comprises on its rear end side at least one projection which lies below the blade in the safety position.

2. The kitchen slicer as claimed in claim 1, wherein the insert lies at least partly on a support of the base in the region of the end side in the safety position.

3. The kitchen slicer as claimed in claim 2, wherein the blade is V-shaped and the end side of the insert tapers in a correspondingly V-shaped manner toward a point, and wherein the projection is arranged in the region of the point of the end side.

4. The kitchen slicer as claimed in claim 3, wherein the projection is arranged around the point.

5. The kitchen slicer as claimed in claim 1, wherein the blade is V-shaped and the end side of the insert tapers in a correspondingly V-shaped manner toward a point, and wherein the projection is arranged in the region of the point of the end side.

6. The kitchen slicer as claimed in claim 5, wherein the projection is arranged around the point.

7. The kitchen slicer as claimed in claim 1, wherein the base and the insert comprise corresponding fixing portions to fix the insert to the base operationally safely in the different positions.

8. The kitchen slicer as claimed in claim 7, wherein the fixing portions comprise a catch.

9. The kitchen slicer as claimed in claim 7, wherein the fixing portions comprise a first catch member on the base and a second catch member on the insert.

10. The kitchen slicer as claimed in claim 9, wherein the second catch member is provided on the lower side of the insert.

11. The kitchen slicer as claimed in claim 9, wherein the fixing portions comprise indentations on the insert.

12. The kitchen slicer as claimed in claim 9, wherein the second catch member comprises a catch lever which projects from the lower side of the insert and engages behind an edge of the base in the safety position.

13. The kitchen slicer as claimed in claim 12, wherein the edge is provided on an end side of a support plate on which the insert inserted into the base lies.

14. A kitchen slicer for cutting food items, comprising:

a base, to which a blade is fixed, which is arranged on an edge of a discharge plate, and an exchangeable insert, which can be fixed to the base in different positions for setting different cutting thicknesses, the insert forming a guide surface on which the items to be cut can be moved toward the blade, the different positions including a safety position in which an end side of the insert is arranged adjacent to the blade in such a way that the guide surface lies at the level of the blade or above it, wherein the insert is fixed to the base in the safety position by fixing means for fixing the insert to the base and by a catch member, the catch member comprising a catch lever which projects from the lower side of the insert and engages behind an edge of the base in the safety position.

15. The kitchen slicer as claimed in claim 14, wherein the edge of the base is an end side of a support plate on which the insert inserted into the base lies.

* * * * *